United States Patent [19]
Karvo

[11] Patent Number: 5,969,092
[45] Date of Patent: Oct. 19, 1999

[54] PREPARATION OF A TALL OIL ROSIN ESTER WITH A LOW ODOR LEVEL

[75] Inventor: Mikko Kalevi Karvo, Oulu, Finland

[73] Assignee: Arizona Chemical Oy, Finland

[21] Appl. No.: 09/063,665

[22] Filed: Apr. 21, 1998

[51] Int. Cl.$^6$ .................................................. C11C 3/00
[52] U.S. Cl. ..................... 530/218; 530/215; 530/217
[58] Field of Search ................................ 530/215, 217, 530/218

[56] References Cited

U.S. PATENT DOCUMENTS

| | | |
|---|---|---|
| 3,780,013 | 12/1973 | Smith . |
| 4,548,746 | 10/1985 | Duncan et al. . |
| 4,659,514 | 4/1987 | Beuke . |
| 4,962,186 | 10/1990 | Johnson, Jr. . |
| 5,084,554 | 1/1992 | Minn . |

FOREIGN PATENT DOCUMENTS

| | | |
|---|---|---|
| 0 641 811 A3 | 9/1994 | European Pat. Off. . |
| 43 08 109 | 3/1993 | Germany . |
| 1296480 | 11/1972 | United Kingdom . |
| 1299344 | 12/1972 | United Kingdom . |

OTHER PUBLICATIONS (McSweeny et al., 1987) "Tall Oil and Its Uses–II". *Specialty Chemicals*.: 37–39.

*Primary Examiner*—Nathan M. Nutter
*Attorney, Agent, or Firm*—Rockey, Milnamow & Katz

[57] ABSTRACT

The invention relates to a process for the preparation of a tall oil rosin ester with a low odor level, which process comprises an esterification step wherein a tall oil rosin is esterified with a polyol in order to form a product which contains a tall oil rosin ester, and evaporation is carried out on this product in order to remove odor components and other volatile components from the product, which evaporation is carried out in a short-path evaporator which has an evaporation surface and, in the vicinity of this surface, a condenser on which the vaporized components to be removed condense, whereupon a tall oil rosin ester with a low odor level is recovered from the evaporator.

13 Claims, No Drawings

PREPARATION OF A TALL OIL ROSIN ESTER WITH A LOW ODOR LEVEL

FIELD OF THE INVENTION

The invention relates to a process for preparing a tall oil rosin ester with a low odor level, usable in demanding applications.

DESCRIPTION OF THE PRIOR ART

Tall oil is obtained as a byproduct of the sulfate pulping process in the form of soap, which is acidified with sulfuric acid before distillation. Pitch, rosin and fatty acid are separated as the principal fractions in the distillation. The rosin contains in the main diterpene-structured tricyclic $C_{20}$-monocarboxylic acids, the proportion of which in tall oil rosin is usually of an order of 85–95%. The balance is made up of fatty acids and neutrals, which are various anhydrides, phenols, sterols, and diterpene alcohols or aldehydes. As a result of the sulfate process, tall oil rosin also contains small amounts of various organic sulfur compounds (total sulfur approx. 1000 ppm), which are considered to give tall oil rosin its typical, somewhat unpleasant odor, clearly distinguishable from that of, for example, gum rosin.

One application of the rosin is its further refining to an additive which yields adhesiveness to adhesives. These adhesive rosins are most commonly either polymerized rosins or rosin esters, which are obtained by allowing polyols, such as pentaerythritol, glycerol or glycols, to react with rosin acids. Typically the preparation of rosin esters takes place by a batch process in molten state and at very high temperatures (250–300° C.). To speed up the reaction, it is common to use catalysts, and to achieve a sufficiently complete esterification, an excess of approx. 15–20% of polyol relative to its stoichiometric amount is generally needed (McSweeney, E. E.; Arlt, H. G., Jr.; Russell, J., Eds., Tall Oil and its Uses—II, Pulp Chemical Association, Inc., New York (1987)). The progress of the reaction is followed by determining the acid number, which is typically in the order of 160–180 mg KOH/g for rosin and within the range of 5–15 for the final product, rosin ester. The reaction time in industrial-scale production is typically 20–30 hours, which includes a water-vapor stripping of a few hours which is commonly carried out as the last step. The purpose of the stripping is, in the manner of water-vapor distillation, to remove from the reaction product any neutrals and, in particular, odor components present in the rosin. It also causes the softening point of the product to rise, which is regarded as a desirable property. However, stripping carried out with water vapor is not capable of removing neutrals and odor components as completely as would be desirable considering the uses of rosin esters. This product property has indeed in recent years become a very significant quality criterion in the comparison of tall oil rosin esters with corresponding esters prepared from gum rosin or with hydrocarbon resins sold for the same uses. The odor typical of gum rosin esters is derived from turpentine residues, which the said rosin type contains in larger amounts than does tall oil rosin. On the other hand, sulfur-containing chemicals are not used in the treatment of gum rosin, and thus corresponding organic sulfur compounds which cause unpleasant odor are not formed in it. Especially demanding uses of rosin esters include hot-melt adhesives for hygiene products and food packaging products, and also the use of glycerol esters of rosin as the binding agent in chewing gum mixes.

The odor level correlates with the concentration of volatile organic compounds (VOC) in the product; VOC is a quantity which can be indicated by measurements as compared with odor intensity, which can be assessed only subjectively. Therefore, the reduction of VOC concentrations in the rosin esters prepared by the process according to the invention as compared with corresponding conventional products is presented below.

The esterification of rosin is well known as a chemical reaction, and publications and patents relating thereto have been presented for decades. However, new inventions aiming at improving the processes and the product quality are created continually and, in particular, numerous methods aiming at improving the color of rosin ester have been patented within the past 10–15 years. As typical examples of these, disclosing generally both esterification and various catalysts and other additives for improving the properties of the product, we can mention, for example, U.S. Pat. Nos. 3,780,013, 4,548,746, 4,659,514 and 4,962,186, as well as the patents cited as references therein. Publications making reference expressly to the removal of odor components from rosin esters were not found, but there is reason to cite GB patent 1 296 480, which discloses a process for reducing the color and odor components of tall oil rosin. In this process, the rosin is first heat-treated at a temperature of 240–280° C. for 2–8 hours in order to convert color and odor components to a heavy fraction, and thereafter the heat-treated rosin is re-distilled, whereby a rosin having a lower color and odor level is recovered as a distillate and the said heavy fraction is recovered as a distillation residue. As a technical option the separate heating step in a reactor and redistillation are slow and expensive considering the further refining of the rosin thereby obtained.

DESCRIPTION OF THE INVENTION

The present invention relates to a process for the preparation of a tall oil rosin ester with a low odor level, the process comprising an esterification step wherein tall oil rosin is esterified with a polyol to form a product containing a tall oil rosin ester, the process being characterized in that the product obtained from the esterification is subjected to evaporation to remove odor components and other volatile components from the product, which evaporation is carried out in a short-path evaporator having an evaporation surface and in its vicinity a condenser on which the removed vaporized components condense, whereupon a tall oil rosin ester with a low odor level is recovered from the evaporator.

The process according to the present invention for preparing a rosin ester is suitable in general for rosin esters, but in particular for rosin esters which have a ring and ball softening point (ASTM E28-92) which is higher than 70° C. The polyols most commonly used for the preparation of rosin esters having the said softening point range include glycerol and pentaerythritol. The initial rosin used may be a tall oil rosin having a softening point within a range of approx. 55–75° C., but preferably within a range of approx. 65–70° C. A rosin of a lower grade than conventional, i.e. a rosin with a lower softening point, may also be used as the initial rosin. Rosin modified in various ways is also a suitable initial substance. Known modifications of rosin include dimerization and reinforcement of rosin with chemicals reacting by the Diels-Alder mechanism, the most commonly used being fumaric acid and maleic anhydride.

The esterification is advantageously carried out in the presence of a catalyst, suitable catalysts including commonly used esterification catalysts such as p-toluene sulfonic acid, hypophosphorous acid, or certain commercial special catalysts such as Irganox 1425 or Irganox B551

(manufacturer Ciba-Geigy). Irganox 1425 is chemically calciumbis[monoethyl(3,5-di-tertiary butyl-4-hydroxybenzyl)phosphonate], and Irganox B551 is a mixture of the former and of Irganox 415 (4,4'-thiobis[2-(1,1-dimethylethyl)-5-methylphenol]) at a ratio of 1:1. It is, of course, possible to add to the product other commonly used additives, such as antioxidants, to improve thermal stability.

According to one preferred embodiment, the amount of polyol is at a substantially equivalent ratio to rosin, in which case the amount of polyol in proportion to rosin is preferably approx. 0.9–1.1:1. This is a clear difference as compared with conventional esterification, in which an approx. 15–20% excess of polyol is typically used.

According to the invention, the esterification is carried out in a known manner until the acid number drops to a level of approx. 15–35, preferably to a range of approx. 20–28. In an industrial-scale production apparatus this happens in a considerably shorter time, approx. 13–17 hours, than in conventional esterification to an acid number of 5–10, since the progress of the reaction slows down considerably just after the acid number reaches a level of 30–25.

The subsequent step in the preparation process is the treatment of the esterification product in a so-called short-path evaporator, wherein the rosin ester is fed into a cylindrical column equipped with a special rotor for spreading the feed liquid into a thin film on the interior surface of the cylinder. A suitable vacuum, approx. 0.1–20 mbar, most preferably approx. 0.2–4 mbar, is produced in the evaporator by suction, whereupon the neutral substances and fatty acids, derived from the tall oil rosin, present in the rosin ester, evaporate together with the unreacted rosin. The temperature of the evaporation surface is typically approx. 150–280° C., and most preferably approx. 220–260° C. The condensing of the volatile components occurs on a so-called cold finger in the middle of the cylinder; this is a separately cooled distillate condenser. An evaporation apparatus of this type has the advantage of rapid condensation of the distillable components, since the distance from the evaporation surface to the condenser surface is significantly shorter than when a conventional apparatus based on an outside condenser is used. The apparatus described enables a good vacuum level to be achieved, which is a prerequisite for achieving the desired evaporation. The distillate flow and the actual product are obtained from the short-path evaporator via separate connections. It is typical of rosin ester treated in the evaporator that its acid number drops to a level of approx. 0.2–10, most preferably to a range of approx. 2–6, which is lower than the acid number, typically 8–15, of rosin esters prepared in a conventional manner. At the same time the softening point rises to a higher level than for esters stripped in a conventional manner in a reactor with water vapor. The softening point of pentaerythritol ester can be brought to a level of approx. 103–108° C. if the acid number is lowered to a level of approx. 0.5–3, and respectively to a level of approx. 98–102° C. if the acid number is of an order of approx. 4–6. The treatment in the short-path evaporator hardly worsens the color of the rosin ester, which is also an important property of the product in terms of hot-melt adhesives. The composition of the distillate varies, of course, depending on the selected evaporation conditions (vacuum and the temperature of the evaporation surface, as well as the amount of feed), but the proportion of neutral components is typically of an order of 30–50%, the balance consisting of fatty acids and unreacted rosin. The amount of distillate is typically approx. 5–20% by weight of the amount of the feed. The lack of odor in the product and its low VOC contents are thus due to a considerable decrease in the concentrations, in the product itself, of the components separated in the short-path evaporation.

The invention is described below in greater detail with the help of examples and comparative tests. The percentages are percentages by weight unless otherwise indicated.

EXAMPLES

Two examples are presented below of the preparation of rosin glycerol ester and rosin pentaerythritol ester on a laboratory scale by the process according to the invention.

Example 1

200 g of a tall oil rosin having a softening point of 61° C., an acid number of 172.0 and a non-saponifiables content of 7.8% was placed in a suitable glass flask equipped with a thermometer and a stirrer. The rosin was melted in a nitrogen atmosphere at a temperature of approx. 180° C., and there were added into the reaction vessel, as a catalyst, 0.8 g of commercial Irganox B551 (Ciba-Geigy) catalyst and, immediately thereafter, 18 g of glycerol in steps. The reaction vessel was equipped with a reflux condenser in which an approx. 120-degree condensing oil circulated, thus allowing the water released in the esterification to leave the reactor but preventing the evaporation of the glycerol. The temperature of the reaction mixture was raised to 275° C. and was kept at that for two hours, whereupon the acid number of the glycerol ester had dropped to 20.9 and its softening point was 69° C. The product was cooled to 220° C. and was subsequently fed into a short-path evaporator having a mantle temperature of 240° C. and a pressure of 0.2 mbar. The feeding rate was 200 ml/h, and the rotation velocity of the rotor was 200. The amount of distillate separated was 15%, and its acid number was 108.3 and the proportion of neutral components in the distillate was surprisingly high, 36.3, which shows that the residue of neutrals in the product itself had dropped to a significantly low level. The acid number of the rosin ester obtained as the product dropped to 0.8 in the evaporation, and its softening point surprisingly rose to 89° C. The initial rosin color determined by the method ASTM D 509-70 was XA-X and that of the product, respectively, X-WW, which indicated that the product became slightly darker in the evaporator.

Example 2

By using the apparatus described in the preceding example, but without the reflux condenser, pentaerythritol ester was prepared by batching into the flask 200 g of a rosin having a softening point of 69° C. and an acid number of 177.5. There were added, as a catalyst, 0.4 g of Ciba-Geigy's whitening agent Irganox 415 and 0.8 g of catalyst Irganox 1425, as well as 24 g of pentaerythritol, at a temperature of 210–240° C. Esterification for three hours at 280° C. decreased the acid number to 18.4, and the softening point measured was 92° C. Furthermore, evaporation in the conditions described in Example 1 produced a pentaerythritol ester having an acid number of 2.0, a softening point of 107° C., and a color of WW-WG. The yield of distillate was 11.5%, its acid number was 126.0 and its content of non-saponifiables was 29.3%. It was surprising in this experiment, also, that the softening point increased by 15° C. during the evaporation treatment and that the content of neutrals in the distillate was high.

The following example illustrates the preparation, on an industrial scale, of an experimental batch of pentaerythritol ester by the method according to the invention:

Example 3

Molten rosin, the measured softening point of which was 65° C., was batched into a reactor in an amount of 9500 kg, in a nitrogen atmosphere. At a temperature of 205–210° C., 35 kg of Irganox B551 was added and immediately thereafter 1050 kg of pentaerythritol in steps, so that the temperature remained above 195° C. during the adding.

The temperature was raised steadily to 275° C. while some nitrogen rinse was added into the reactor. Esterification was followed by determining the acid number as a function of time. When the rate of acid number decrease had slowed down significantly, to less than three units per hour, the batch was cooled to 255° C., and the product was pumped to a short-path evaporator. The time from the batching to the emptying of the reactor was 13 hours. The softening point had at this stage risen to 84° C., and the acid number of the ester was 23.9 before the evaporation. The ester was fed at a rate of 2200 kg/h to the short-path evaporator having a mantle temperature of 240° C. and a pressure of approx. 1 mbar. The yield of the final product was 85.8% of the evaporator feed, and the conventional analyses were as follows: acid number 5.5; softening point 100° C.; and color XC-XB. The acid number of the distillate was 102.

Odor Level Comparison Tests

In order to assess the odor levels of the esters prepared by using a short-path evaporator, a smelling test in which five persons belonging to an odor panel, trained in the task, performed odor assessments.

Treatment of the odor specimen: 50 g of the rosin ester to be tested was placed, decimated, in a carefully disinfected brown and wide-mouthed one-liter glass flask equipped with a ground stopper, and 50 ml of distilled water was poured over the rosin ester. The closed flask was placed on a boiling water bath for two hours, and thereafter the flask was placed on a 60° C. hot plate in a separate odor laboratory for half an hour.

Carrying out of the test: The test covers five different specimens which the selected testers assess sensorily by sniffing the momentarily opened specimen flasks. As a result, each tester places the specimens in an order according to an increasing odor level. The result of the whole-test is calculated statistically so that the result of each tester is compared with the mean, and if the thus obtained correlation coefficient of an individual tester remains below a certain level, the result of this tester is excluded from the calculation of the final result. The odor assessment of the panel can be deemed to be reliable when at least four testers attain an acceptable correlation to the means. The relative intensity of the odor among the assessed specimens is described with a number ranging from 1 to 5, the specimen of the lowest odor level receiving the lowest numeric value and the specimen with the highest odor level the highest numerical value.

For this test there were selected, from the rosin esters prepared by the new process according to the invention, two pentaerythritol esters (A, B) and one glycerol ester (C) and, as controls, two glycerol esters prepared by the conventional procedure, i.e. esterification and finally water-vapor stripping, one of them being a rosin of a so-called adhesive rosin grade (D) and the other a rosin of the food grade (E), usable for a chewing gum mix. The following table shows the results of the test, in which all of the five testers were accepted for the calculation of the final result, and the result can thus be deemed reliable.

| Specimen | Rosin ester | Odor level (1–5) |
| --- | --- | --- |
| A | Pentaerythritol ester, new process | 1.4 |
| B | Pentaerythritol ester, new process | 1.8 |
| C | Glycerol ester, new process | 3.4 |
| D | Glycerol ester, adhesive grade | 3.6 |
| E | Glycerol ester, chewing gum grade | 4.8 |

According to the result, the odor level of rosin esters prepared by the process according to the invention was lower than that of the glycerol esters used as controls, the latter having been selected from among products which represent the best level with respect to the property being tested.

Another method for the assessment of the odor level is to determine from the product the amount of volatile compounds, i.e. the so-called VOC concentration, which correlates with the odor perceivable sensorily. For measuring this property, our laboratory used a method in which 20 g of the product being tested is weighed into a small aluminum mold, and thereafter the specimen is kept for five hours in a convection oven at 180° C. After the heat treatment, the reduction of the mass is determined by weighing, and the weight loss is indicated in per cent. Glycerol and pentaerythritol esters prepared by a conventional procedure were tested alongside rosin esters prepared by the evaporation process. The following weight losses were measured in the study for the different specimens:

| Specimen | Rosin ester | Pressure loss/% (5 h/180° C.) |
| --- | --- | --- |
| A | Pentaerythritol ester, new process | 0.12 |
| B | Pentaerythritol ester, new process | 0.17 |
| C | Glycerol ester, new process | 0.20 |
| D | Pentaerythritol ester, conventional grade | 1.15 |
| E | Glycerol ester, conventional grade | 1.40 |

From these results of pressure loss measurements it can be clearly seen that the residues of volatile components are clearly reduced in the tall oil rosin esters prepared by the new process according to the invention.

I claim:

1. A process for the preparation of a tall oil rosin ester with a low odor level, which process comprises esterifying tall oil rosin with a polyol in one vessel to form a product which contains a tall oil rosin ester, subjecting the product obtained from the esterification to evaporation in order to remove odor components and other volatile components from the product, which evaporation is carried out in a separate short-path evaporator which has an evaporation surface, and condensing the vaporized components on a condenser in the vicinity of the evaporation surface whereupon a tall oil rosin ester having a low odor level is recovered and the ratio of the polyol used in the esterification to the rosin is approximately 0.9–1.1:1.

2. A process according to claim 1, wherein a pressure within a range of approximately 0.1–20 mbar is used in the evaporator, and the temperature of the evaporation surface is within a range of approximately 150–180° C.

3. A process according to claim 1 wherein the rosin to be esterified is tall oil rosin or modified tall oil rosin.

4. A process according to claim 3, wherein the softening point of the rosin is approximately 55–75° C.

5. A process according to claim 1 wherein the polyol used for the esterification is glycerol or pentaerythritol.

6. A process according to claim 1 wherein the acid number of the product decreases during the esterification to a level of approximately 35–15.

7. A process according to claim 1 wherein approximately 5–20% by weight of a substance mainly made up of a mixture of neutrals, fatty acid and rosin is removed from the product during the evaporation step.

8. A process according to claim 1 wherein the acid number of the tall oil rosin ester obtained from the evaporation is approximately 0.2–10.

9. A process according to claim 2 wherein the pressure is within a range of approximately 0.2–4 mbar.

10. A process according to claim 2 wherein the temperature of the evaporation surface is within a range of approximately 220–260° C.

11. A process according to claim 4 wherein the softening point of the rosin is approximately 65–70° C.

12. A process according to claim 6 wherein the acid number of the product decreases during the esterification to a level of approximately 28–20.

13. A process according to claim 8 wherein the acid number of the tall oil rosin ester obtained from the evaporation is approximately 2–6.

* * * * *